Figure 1:
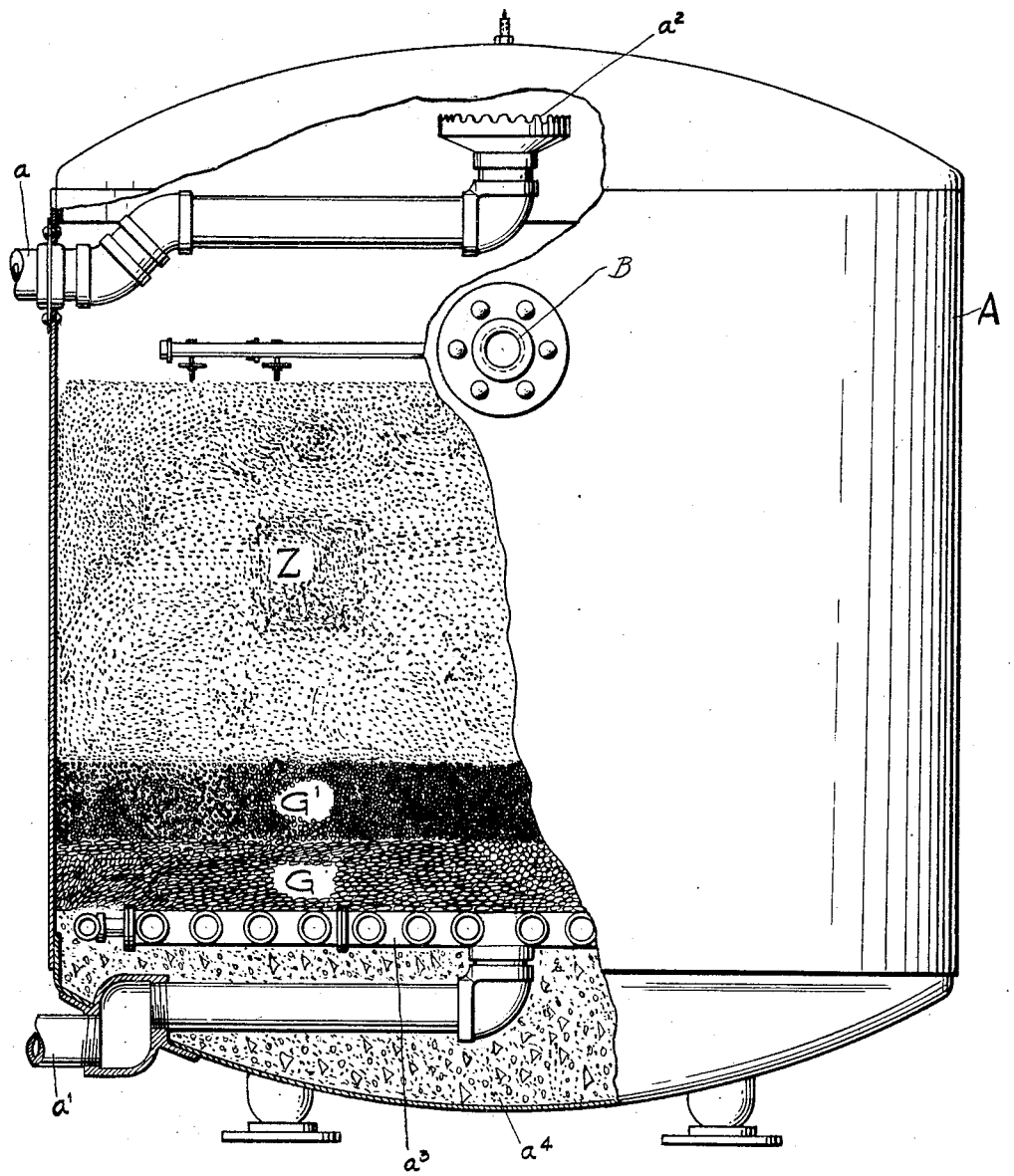

Oct. 13, 1931.   E. NORDELL ET AL   1,827,603
METHOD OF AND MEANS FOR FEEDING A REGENERATING BRINE SOLUTION
TO THE TOP SURFACE OF A ZEOLITE BED IN A ZEOLITE
WATER SOFTENER OF THE FILTER TYPE
Filed Aug. 5, 1925   2 Sheets-Sheet 2

Patented Oct. 13, 1931

1,827,603

UNITED STATES PATENT OFFICE

ESKEL NORDELL AND WALTER J. HUGHES, OF FORT WAYNE, INDIANA, ASSIGNORS, BY MESNE ASSIGNMENTS, TO THE PERMUTIT COMPANY, OF NEW YORK, N. Y., A CORPORATION OF DELAWARE

METHOD OF AND MEANS FOR FEEDING A REGENERATING BRINE SOLUTION TO THE TOP SURFACE OF A ZEOLITE BED IN A ZEOLITE WATER SOFTENER OF THE FILTER TYPE

Application filed August 5, 1925. Serial No. 48,286.

Our invention relates to a method of and means for feeding a regenerating brine solution to the top surface of a zeolite bed in a zeolite water softener of the filter type.

In the use of the old, slow regenerating zeolites the container was drained and all the voids filled with brine solution which completely covered the zeolite bed. This was allowed to stand in contact with the bed for a long period of time, often up to twelve hours.

Many of the newer zeolites regenerate rapidly, in fact almost instantaneously, and this is of great economic importance. In water softeners charged with such rapid regenerating zeolites the bed is not drained, and the brine has heretofore been fed substantially above the bed through the same opening that during the softening operation supplies the raw water. The brine when so fed in falls quickly to the surface of the zeolite bed, much less of it reaching the outer portions of the surface than that directly under the inlet or nearly contiguous thereto. The brine in passing through the intervening column of water in the water softener reaches the top surface of the zeolite bed more or less diluted as well as unevenly diffused over the bed.

In such softeners water is then again admitted and the brine is immediately forced through the zeolite bed by the pressure of fresh water from the top, and passes through the bed in this unevenly diffused and further diluted form. The result is that the zeolite bed is unevenly regenerated throughout and that if substantially fully regenerated will require a greatly increased quantity of brine, greatly increasing the cost of operating the softener.

The principal object of our invention is to feed directly on top of the substantially exhausted zeolite bed a layer of brine substantially uniform in thickness and of substantially even strength throughout. The layer will be fed in under the column of superimposed water and therefore is just as practicable in a pressure system as in a gravity system.

As soon as the desired quantity of brine has been fed in on top of the zeolite bed it is forced through the bed by the fresh water above, acting substantially as a liquid piston. Being brought uniformly in contact with all particles of the zeolite bed it completely regenerates the same, with the least possible quantity of brine.

It will be seen that with a given consumption of salt there will result a greatly increased capacity. Our experience has shown instances in which with the same consumption of salt one and one-half times the quantity of soft water has been produced in the same apparatus, all other conditions remaining the same.

In the particular embodiment of our invention selected for illustration

Figure 2:
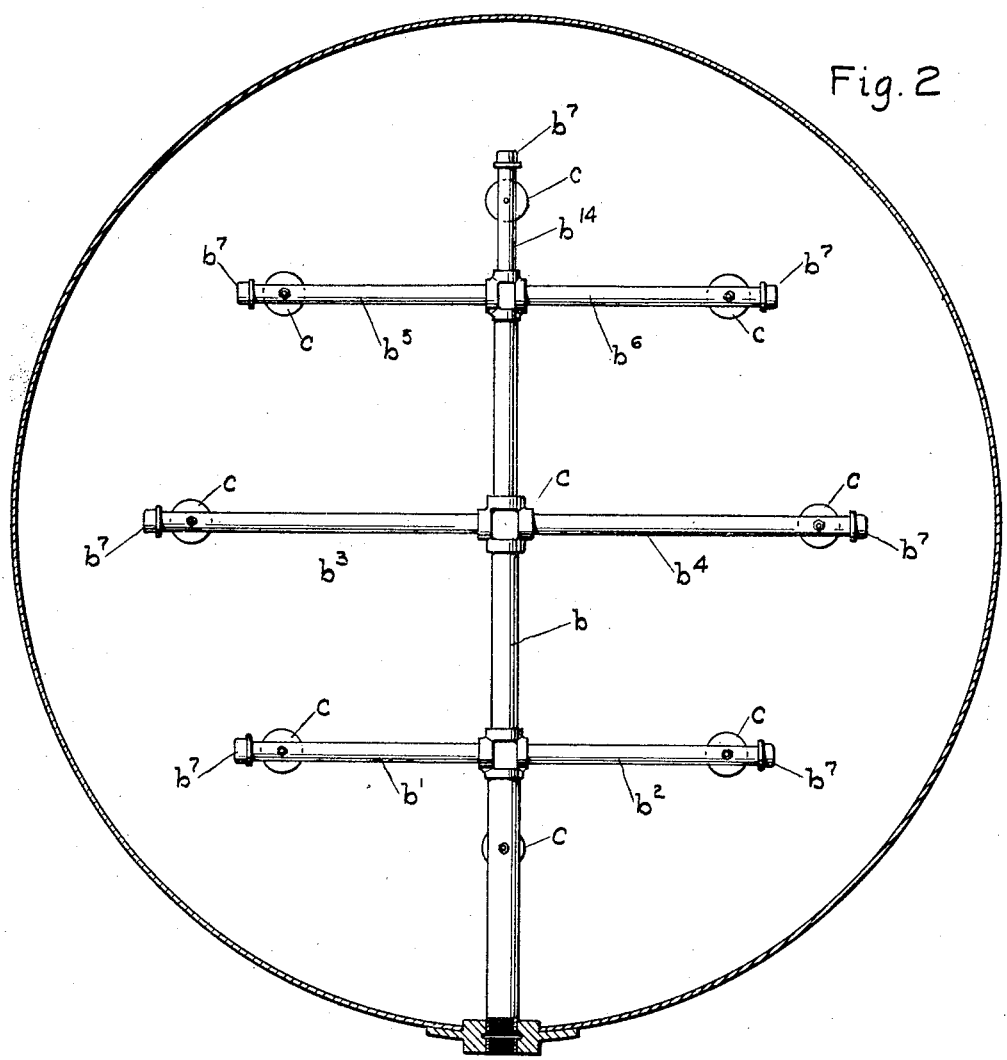
Figure 3:
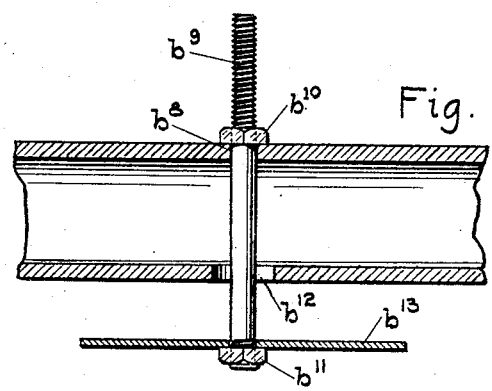

Figure 1 is an elevation of the cylindrical zeolite water softener with the upper part broken away and in section to show the position of the zeolite bed and the brine feeding means, Fig. 2 is a top plan view of the same, and Fig. 3, a detail, is an enlarged elevation of one of the brine inlet units with its baffle.

Referring now to the drawings, A is the water softener casing with hard water inlet $a$ and soft water outlet $a^1$. The inlet pipe terminates inwardly in an axially positioned distributor head $a^2$, and the collector pipes $a^3$ receive and convey the softened water to outlet $a^1$. At the bottom the casing is filled flush with the tops of the collector pipes $a^3$ with concrete $a^4$, upon which rests layers of graded gravel $G$, $G^1$, which support the bed of zeolite Z. The brine inlet B terminates inwardly in a supply pipe $b$ to which are connected branch pipes $b^1$, $b^2$, $b^3$, $b^4$, $b^5$ and $b^6$, shown in Fig. 2, and the supply pipe and branch pipes are supplied with suitably positioned brine distributor heads C, as shown in Fig. 3. Each of these heads is formed in the following manner: Preferably contiguous to a cap $b^7$ is bored a vertical hole $b^8$ in the top of the pipe large enough to receive the threaded end of a bolt $b^9$. A nut $b^{10}$ at the top of this bolt $b^9$ allows for vertical adjustment. On the lower side of the pipe in line with this upper hole $b^8$ is bored a larger hole or orifice $b^{12}$ through which the bolt hangs, and on the lower end of the bolt, supported by its head $b^{11}$ rests the baffle disc $b^{13}$.

We have found by experience that in a construction where each arm carries a single brine orifice, it is best to use a ¾ inch pipe and a ½ inch outlet orifice on the under side, a $\frac{3}{16}$ inch bolt centered thereon and a baffle disc 2½ inches in diameter suspended about ½ inch below the orifice; one of these outlet orifices being used for each four square feet of zeolite bed surface. A suitable rate of flow of liquid in such an apparatus is four gallons per minute for each inlet orifice.

The operation is as follows: When the zeolites have been exhausted of their water softening capacity and have been back-washed so as to stir them up and wash away impurities mechanically collected, without draining the water out of the casing, brine is admitted through the inlet B to the supply pipe and the branch pipes $b^1$, $b^2$, $b^3$, $b^4$, $b^5$ and $b^6$ and the extension $b^{14}$ of the supply pipe, and the brine flows out each of the orifices $b^{12}$ and is diffused horizontally and gently by the baffle discs $b^{13}$ without disturbing the surface of the zeolite bed and thus covering the contiguous surface of the zeolite bed to a substantially even depth with brine of substantially the same strength as introduced. As the brine is a heavier liquid than water it will lie in a fairly well defined layer under the water over same and without tending to diffuse into or become diluted with the water above it.

The supply of brine is then shut off, the supply of water is again admitted through inlet $a$ and distributor head $a^2$ and a column of water with the brine piston under it is forced down through the zeolite bed, and as the brine comes in contact with the particles of zeolite, completely and evenly regenerates the bed throughout. Continued flow of water washes the bed free of brine and the water softening apparatus is again ready for use.

We do not intend to limit ourselves to the precise structure shown but claim as within the scope of our invention any apparatus readable on the claims.

We claim as our invention and desire to secure by Letters Patent of the United States:—

1. The method of feeding brine to the top of a bed of zeolites to regenerate them, which consists in admitting the brine immediately over said bed at points so spaced from each other as to lay down a substantially uniform layer thereof, leaving the surface of the zeolite bed undisturbed.

2. The method of feeding brine to the top of a bed of zeolites immersed in water in a water softening container, which consists in admitting the brine immediately over said bed at points so spaced from each other as to lay down a substantially uniform layer thereof on top of the zeolite bed and under the water in the upper part of the container for said bed.

3. The method of feeding brine on top of a bed of exhausted zeolites immersed in water in a water softening container, which consists in laying a stratum of brine on the bed and under the water in the upper part of the container holding said bed.

4. Method of feeding brine on top of a zeolite bed in a water softener container, which consists in laying a stratum of brine on the bed while said bed is immersed in water.

5. A water-softening apparatus having a zeolite container, a zeolite bed in said container, a space above said bed, a brine supply pipe disposed across and above and near said bed, branch pipes runinng from said brine supply pipe, openings leading from the bottom of said branch pipes and horizontally disposed baffle plates depending from said branch pipes immediately below said openings, said branch pipes, openings and baffles being adapted to lay down a substantially uniform stratum of brine on the zeolite bed.

6. A water-softening apparatus having a zeolite container, a zeolite bed in said container, a space above said bed, a brine supply pipe disposed across and above and near said bed, branch pipes running from said brine supply pipe, openings leading from the bottom of said branch pipes, rods attached to the branch pipes and depending through said openings and horizontally placed baffle plates attached to said rods immediately below said openings, said branch pipes, openings and baffles being adapted to lay down a substantially uniform stratum of brine on the zeolite bed.

In testimony whereof we have hereunto set our hands.

ESKEL NORDELL.
WALTER J. HUGHES.